(12) United States Patent
Michelini et al.

(10) Patent No.: US 10,768,295 B2
(45) Date of Patent: Sep. 8, 2020

(54) GROUND-BASED, MULTI-BISTATIC INTERFEROMETRIC RADAR SYSTEM FOR MEASURING 2D AND 3D DEFORMATIONS

(71) Applicant: IDS GEORADAR S.r.l., Pisa (IT)

(72) Inventors: Alberto Michelini, Pisa (IT); Francesco Coppi, Pisa (IT); Alberto Bicci, Pisa (IT)

(73) Assignee: IDS GEORADAR S.R.L., Milan (IT)

( * ) Notice: Subject to any disclaimer, the term of this patent is extended or adjusted under 35 U.S.C. 154(b) by 414 days.

(21) Appl. No.: 15/710,421

(22) Filed: Sep. 20, 2017

(65) Prior Publication Data
US 2018/0081051 A1    Mar. 22, 2018

(30) Foreign Application Priority Data
Sep. 21, 2016   (IT) .................. 102016000094991

(51) Int. Cl.
   *G01S 13/90*   (2006.01)
   *G01S 7/40*    (2006.01)
   (Continued)

(52) U.S. Cl.
   CPC ........ *G01S 13/9023* (2013.01); *G01S 7/4021* (2013.01); *G01S 13/003* (2013.01);
   (Continued)

(58) Field of Classification Search
   CPC .. G01S 13/9023; G01S 7/4021; G01S 13/003; G01S 13/89; G01S 13/878; G01S 13/90; G06T 7/246
   (Continued)

(56) References Cited

U.S. PATENT DOCUMENTS

| | | | | |
|---|---|---|---|---|
| 3,725,938 A | * | 4/1973 | Black | ...................... G01S 1/02 342/435 |
| 2010/0271255 A1 | * | 10/2010 | McKitterick | ............ G01S 3/42 342/27 |

OTHER PUBLICATIONS

Daniele Mecatti et al., "A novel ground based multi bistatic radar for interferometric measurement of displacement vector", Geoscience and Remote Sensing Symposium IGARSS 2011, Jul. 24, 2011, pp. 3983-3986 (Year: 2011).*

(Continued)

*Primary Examiner* — Frank J McGue
(74) *Attorney, Agent, or Firm* — Stein IP, LLC

(57) ABSTRACT

The invention relates to a method and to an apparatus for determining a displacement vector field of a scenario, by a ground-based interferometric radar system operated in multi-bistatic mode and comprising a main radar transceiver device and at least one passive radar receiver device arranged at a predetermined distance from each other, in which the oscillators of the at least two radar are synchronized, in time and in frequency, in particular according to a signal coming from a global positioning system. The method provides a step of interferometrically determining at least one first displacement map and one second displacement map of the scenario between a previous time and a subsequent time, expressed in a global reference system and having each a plurality of pixels each associated to a respective domain of the scenario. The first and the second displacement maps comprise first and second displacement components of the pixel, respectively, along the line of sight of the main radar device, and along the bisectors of an angle between said line of sight and the line of sight of passive radar device, for each pixel. A step is then provided of combining the two displacement maps, more in detail, the first and the second component of each pixel, creating a displacement vector field of displacements occurred (Continued)

between the previous time and the subsequent time. The invention provides an apparatus much easier and less expensive than the prior art, in which a plurality of multi-monostatic, transceiving radar devices are used.

15 Claims, 7 Drawing Sheets

(51) Int. Cl.
    *G01S 13/00*     (2006.01)
    *G01S 13/89*     (2006.01)
    *G01S 13/87*     (2006.01)
    *G06T 7/246*     (2017.01)

(52) U.S. Cl.
    CPC ............ *G01S 13/878* (2013.01); *G01S 13/89* (2013.01); *G06T 7/246* (2017.01)

(58) Field of Classification Search
    USPC .......................................................... 342/59
    See application file for complete search history.

(56) References Cited

OTHER PUBLICATIONS

Giuseppe Giunta et al., "A Radar-Based System to Estimate the 3D Vibrational Motion of Gas Pipes, Filippo Speziali", 14th International Radar Symposium IRS 2013, Jun. 21, 2013, pp. 1-6 (Year: 2013).*

Livia Leoni et al., "Techniques for three-dimensional displacement vector using ground-based interferometric synthetic aperture radar", First Asia Pacific Slope Stability in Mining Conference, Sep. 8, 2016, pp. 1-6 (Year: 2016).*

Tao Zeng et al., "Multi-static MIMO-SAR three dimensional deformation measurement system", 5th Asia-Pacific Conference on Synthetic Aperture Radar APSAR 2015, Sep. 1, 2015, pp. 297-301 (Year: 2015).*

Jordan Severin et al., "Use of ground-based synthetic aperture radar to inventigate the complex 3-D kinematics of a large open pit slope", International Symposium on Rock Slope Stability in Open Pit Mining and Civil Engineering, Sep. 15, 2011 (Year: 2011).*

Michele Salvoni et al., "Improvement of pseudo-3D pit displacement mapping technique through geodetic prism data integration", Proceedings of the 9th Symposium on Field Measurements in Geomechanics, Sep. 11, 2015, pp. 185-194 (Year: 2015).*

Massimiliano Pieraccini, "Real Beam vs. Synthetic Aperture Radar for Slope Monitoring", Progress in Electromagnetic Research Symposium, Aug. 15, 2013, pp. 1627-1632 (Year: 2013).*

European Search Opinion, EP3299842, dated Jan. 22, 2018 (Year: 2018).*

* cited by examiner

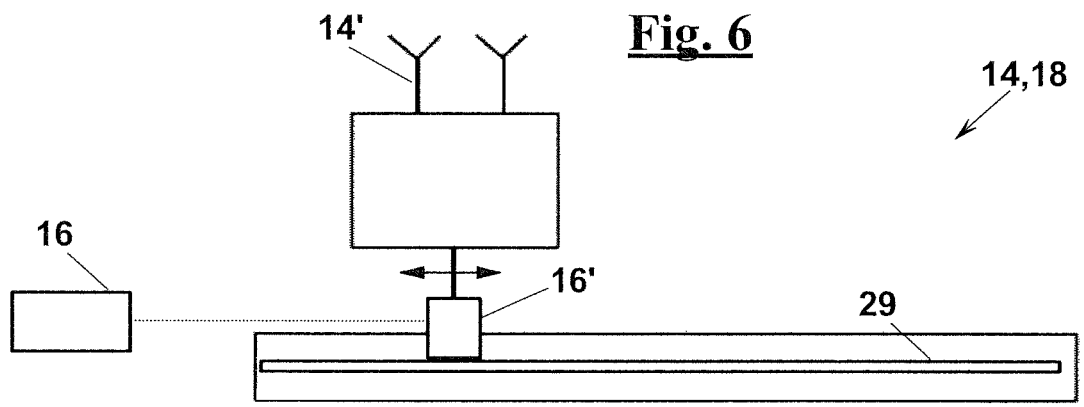
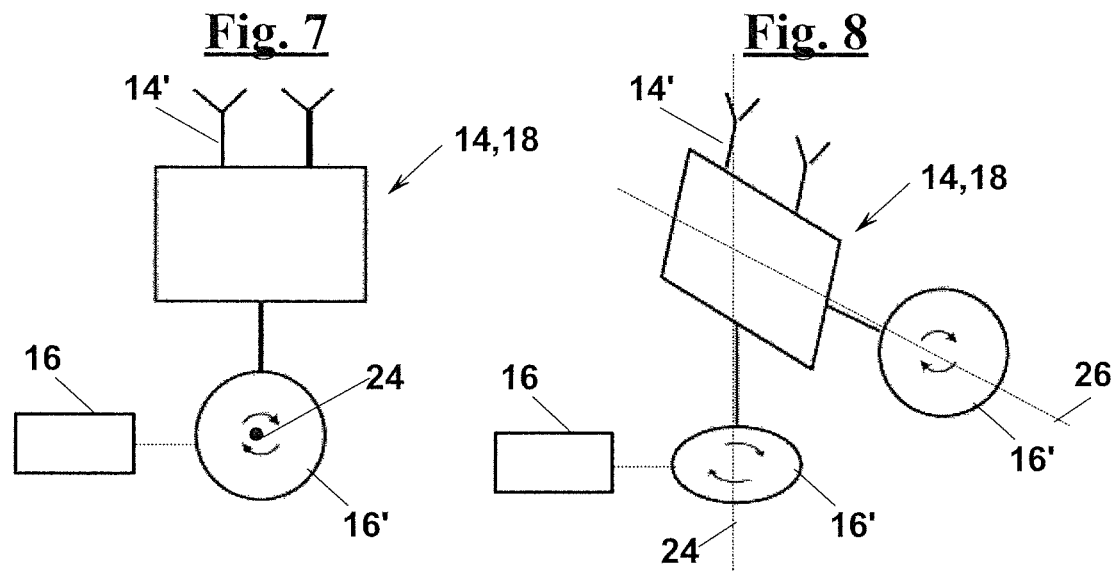
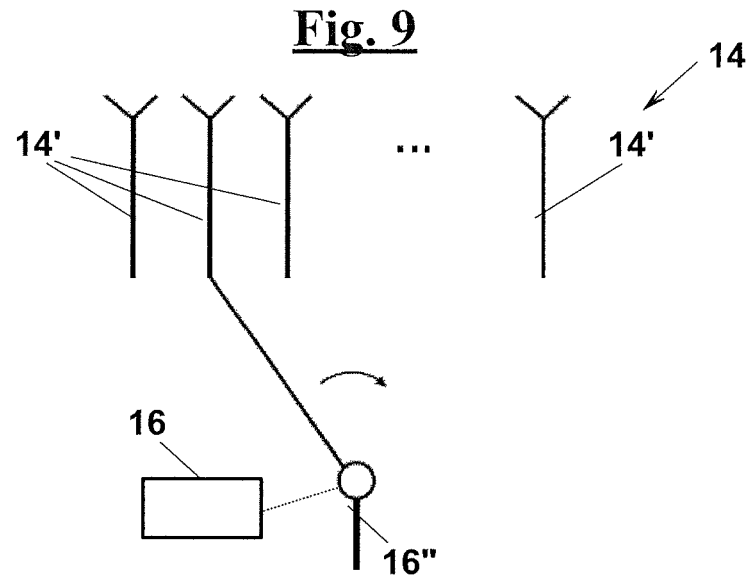

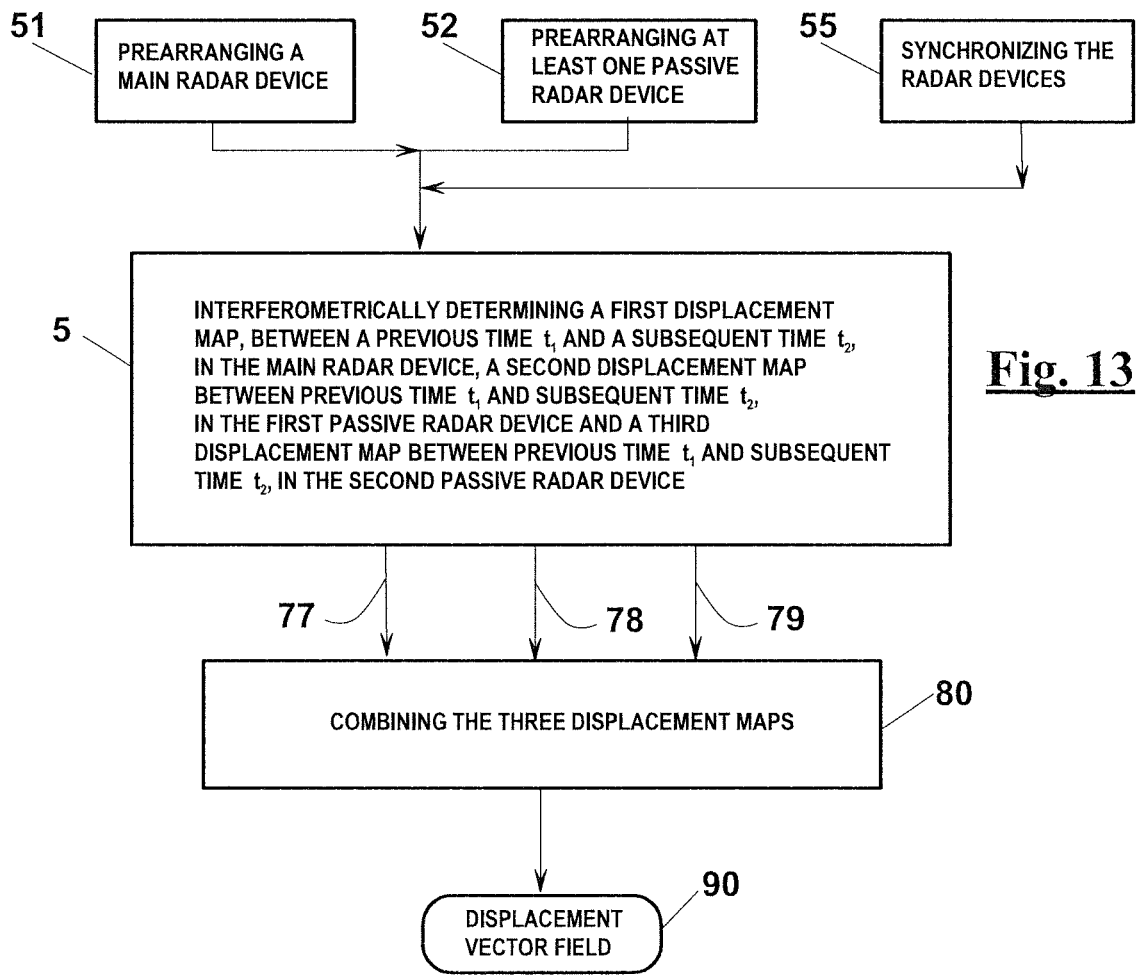
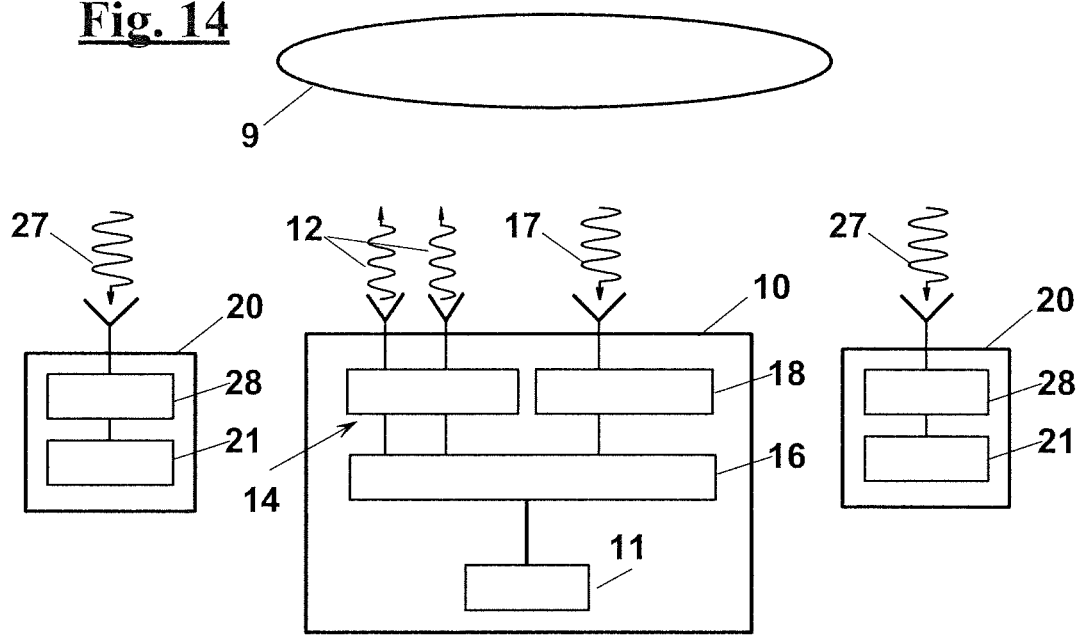

GROUND-BASED, MULTI-BISTATIC INTERFEROMETRIC RADAR SYSTEM FOR MEASURING 2D AND 3D DEFORMATIONS

INCORPORATION BY REFERENCE

This application is based upon and claims the benefit of priority from the corresponding Italian Patent Application No. 102016000094991 filed on Sep. 21, 2016, the entire contents of which are incorporated herein by reference.

FIELD OF THE INVENTION

The present invention relates to a method and to an apparatus for monitoring the deformation of a body, i.e. for systematically measuring 2D and/or 3D displacement vectors thereof, by means of a ground-based, multi-bistatic interferometric radar system.

Such detections are useful, in particular, for monitoring the conditions of earth's crust elements, as in the case of landslides, typically mine landslides, or for monitoring the stability of such structures as buildings, bridges, and the like.

SUMMARY OF THE PRIOR ART

In order to permanently detecting shape and/or dimension modifications of a body, techniques are known, in particular, that use ground-based interferometric radar systems, also known by the acronym "GBInRad". As well known, interferometric radars operate by emitting a phase-coherent microwave signal, and by receiving a signal reflected by the targets of interest. The interferometric technique consists in comparing two consecutive measurements, in which the phase of one measurement is subtracted from the other measurement.

GBInRad systems provide several advantages in comparison with other deformation monitoring techniques, among which remote sensing, very small deformation sensitivity, i.e. down to 0.1 mm, long-distance measurements, i.e. up to 5 Km, imaging capability, i.e. several points can be measured at once, and short scanning times, i.e., down to a few seconds.

In deformation monitoring by means of GBInRad systems, the phase difference between two radar images is related with the deformation or displacement component along the line of sight, i.e. along the line connecting the radar and the target. Actually, the main drawback of these systems is that they are able to detect deformations occurring along the line of sight only, while the monitored targets can be deformed in any direction of a two-dimensional or three-dimensional space.

In order to overcome the above-mentioned drawback, i.e. in order to fully detecting a displacement vector by GBInRad systems, apparatuses have been developed comprising a plurality of these systems operating in a multi-monostatic mode and placed at different locations, said apparatuses combining the line-of-sight deformations measured by each system, so as to fully reconstruct the displacement vector. An example of that is disclosed in US 2015/0309161. However, the use of several interferometric radar systems complicates the layout and increases the costs of such apparatuses, in particular, in connection with energy consumption.

As an alternative, apparatuses have been proposed in which a GBInRad system is operated in a multi-bistatic mode. In other words, one or more transmitters operate together with a plurality of receivers, typically with two receivers, which are arranged at different locations, like in the bistatic radar systems. In particular, the system described in Mecatti D. et al., "A novel ground-based multi bistatic radar for interferometric measurement of displacement vector", Geoscience and Remote Sensing Symposium (IGARSS), 2011 IEEE International. IEEE, 2011, has the basic drawbacks of requiring radiofrequency connections between the receivers and the main radar unit, so that the signals coming from the receivers can reach the main radar unit. In particular, coaxial cables are used for the radiofrequency connections. Coaxial cables cannot be too long, in order to avoid inacceptable loss of signal and phase change, and this restricts the distance at which the receivers can be arranged from the main radar unit.

Moreover, Mecatti D. et al. describes a static transmission element, therefore the device is not able to provide an imaging of the scenario, i.e. an at least two-dimensional image thereof, but only a range profile thereof.

CN104849712 (A) describes an apparatus for monitoring small 3D deformations, comprising three MIMO-SAR devices (Multiple Input-Multiple Output Synthetic Aperture Radar) arranged at three different locations for detecting data under three different angles. In a reception step, each radar receives radar signals back-scattered by the scenario in response to a signal transmitted by the radar itself, and in response to signals transmitted by the other two radars. After each scenario scanning, these return signals are sent to a main computer, in order to obtain images under three different angles of sight. This apparatus is able to reconstruct a displacement vectorial fields, but the related equipment, installation and operation costs are important.

SUMMARY OF THE INVENTION

It is therefore a feature of the present invention to provide a method for monitoring deformations in a scenario, using a single ground-based interferometric radar system operated in bistatic mode, which makes it possible to detect a two-dimensional or three-dimensional displacement vector field of this scenario.

It is also a feature of the invention to provide an apparatus that carries out this method.

These object, and others, are attained by a method for determining a displacement vector field of a deformable scenario, comprising the steps of:
 prearranging a main radar device having a transmission unit and a reception unit for receiving from a first field of sight;
 prearranging at least one passive radar device having a reception unit for receiving from a second field of sight, at a predetermined distance from the main radar device, the main radar device and the at least one passive radar device having respective oscillators associated to the reception unit and to the transmission unit;
 the main radar device and the at least one passive radar device arranged in such a way that the scenario is included in a region common to the first field of sight and to the second field of sight;
 wherein the steps of prearranging the main radar device and the at least one passive radar device comprise steps of measuring respective positions and respective orientations in a global reference system,
 synchronizing the at least one passive radar device with the main radar device, comprising:
 a step of aligning a time reference of the main radar device with a time reference of the at least one passive radar device;

a step of aligning an oscillation frequency reference of the oscillators of the main radar device and of the at least one passive radar device;

interferometrically determining at least one first displacement map and a second displacement map of the scenario between a previous time and a subsequent time in the main radar device and in the at least one passive radar device, respectively, the at least one first and one second maps expressed in the global reference system, the at least one first and one second maps having each a plurality of pixels each associated to a respective domain of the scenario, the first displacement map comprising, for each own pixel, a respective first displacement component along a first line of sight of the main radar device with respect to the domain, the second displacement map comprising, for each own pixel, a respective second displacement component along the bisector of an angle formed by the first line of sight and by a second line of sight of the at least one passive radar device with respect to the domain;

combining the first displacement map and of the second displacement map, wherein at each pixel the respective first displacement component and the respective second displacement component are combined to obtain a displacement vector of the respective domain between the previous time and the subsequent time, in order to form the displacement vector field.

The steps of measuring the position and the orientation of the main radar device and of the or each passive radar devices are carried out in a global reference system, such as the Universal Transverse Mercator (UTM) coordinate system, so that they can be compared with one another.

This way, the modification of the position or of the orientation of the transmission unit of the main radar device, during the scanning, enables the passive radar device, or each passive radar device, to provide a displacement map, like if the passive radar device itself carried out a scanning. It is possible to show that this displacement map is obtained, for each point of the scenario, like if the apparatus comprises a second radar device comprising a transmission unit, instead of a passive radar device, the second radar arranged at the middle point of the segment joining the position of the main radar device with the true position of the passive radar device.

In other words, the or each passive radar device provides a displacement map of the scenario along an ideal line or line of sight that is the bisector of the angle between the true line of sight of one point, with respect to the main radar device, and the line of sight of that point with respect to the passive radar device.

If two or three displacement maps of the scenario are known, depending upon how many passive radar devices are present, i.e., if two or three components are known, respectively, of the displacement vector of each domain of the scenario along two lines, or three non-coplanar lines, the displacement vector can be calculated by conventional analytic procedures, and therefore the two-dimensional or three-dimensional displacement vector field, respectively, of the scenario, can be calculated as well.

In other words, the apparatus according to the invention can provide an imaging of the scenario that is the same as the one that would be provided by a conventional apparatus comprising more than one radar device comprising both a receiver and a transmitter, at a considerably higher construction, maintenance and operation cost, due to the presence of a plurality of transmitters.

Such an operation of the apparatus according to the invention is only possible if an accurate time and frequency synchronization is made between the or each passive radar device oscillator, with the oscillator of the main radar device.

Preferably, the steps of aligning the step of synchronizing are carried out through a reference signal coming from a global positioning system. Preferably, the step of aligning a time reference is carried out within a predetermined time tolerance range narrower than $10^{-8}$ seconds. Preferably, the step of aligning a frequency reference is carried out within a frequency tolerance range narrower than $10^{-1}$ Hertz.

The use of a reference signal coming from a global positioning system in order to align the time and phase references of the main radar device and of the or each oscillators of the or each passive radar device allows a time and phase synchronization without requiring any radiofrequency connection between these devices, in particular without requiring any cable connection, as it is the case, in Mecatti et al (cit.), which overcomes the drawbacks of the prior art. This synchronization can be carried out, for instance, by GPS-disciplined oscillators provided in the main radar device and in the at least one passive radar device.

In particular the step of interferometrically determining the first and the second displacement maps comprises steps of:

firstly and secondly scanning the scenario, the firstly and the secondly scanning performed starting from the previous time and from the subsequent time, respectively, each firstly and secondly scanning comprising a plurality of consecutive steps, each consecutive step comprising the steps of:

transmitting radar transmission signals by the main radar device, wherein, in each consecutive steps, the radar transmission signal is emitted by a transmission element of the transmission unit of the main radar device having a different transmission and/or orientation position with respect to another of the consecutive steps;

receiving, by the main radar device, synchronously and coherently to the step of transmitting, and acquiring first data in the form of a back-scattered radar signal from the scenario;

receiving, by the at least one passive radar device, synchronously and coherently to the step of transmitting, and acquiring second data in the form of a scattered radar signal from the scenario;

processing the first data and the second data in the main radar device and in the at least one passive radar device, respectively, obtaining a first and a second previous image of the scenario, pertaining to the previous time, and a first and a second subsequent image of the scenario, pertaining to the subsequent time;

comparing the first subsequent image with the first previous image, and the second subsequent image with the second previous image, obtaining a first displacement map and a second displacement map of the scenario, respectively, the first and the second displacement maps expressed in the global reference system, the first and the second displacement maps having each a plurality of pixels each associated to a respective domain of the scenario.

In particular, the step of processing comprises a step of correcting synchronization errors that may have occurred between the oscillators.

In particular, the first previous image and the first subsequent image are formed in a local reference system of the main radar device, while the second previous image and the second subsequent image are formed in a local reference system of the at least one passive radar device.

For example, the main radar device can be a synthetic aperture radar (SAR), wherein a same transmission element of the transmission unit of the main radar device has a different position in each consecutive steps.

As an alternative, the main radar device can be a real aperture radar (RAR), where the transmission element is a directional transmission element rotatably arranged about an axis and that has a different orientation in each consecutive steps.

In particular, the rotatable directional transmission element can be configured for emitting signals according to a beam selected between a pencil beam and a fan beam.

As an alternative, the main radar device can be an active-phased array radar, comprising a plurality of transmission elements having different positions, wherein a respective transmission element is operated at each of the consecutive steps of the step of firstly and secondly scanning for carrying out the step of transmitting.

In an exemplary embodiment, the first and second previous images and the first and second subsequent images are two-dimensional images, and a step is provided of acquiring a digital three-dimensional model of the scenario, this digital three-dimensional model associating three coordinates, expressed in the same global reference system that is used in the steps of measuring positions and orientations of the main radar device and of the at least one passive radar device, in order to associate the displacement vector field to the digital three-dimensional model.

The digital elevation model can be obtained from a database, otherwise or can be obtained by measurements.

Besides positioning the devices and measuring their position and orientation, as mentioned above, The steps of prearranging the main radar device and the or each one passive radar device can also comprise steps of calculating, for each pixel of the digital elevation model (DEM), the corresponding direction of the line of sight starting from the main radar device position and from the or each passive radar device position.

In a advantageous exemplary embodiment, the step of prearranging at least one passive radar device provides prearranging a first and a second passive radar device having a different elevation with respect to each other, and the step of interferometrically determining generates a third displacement map comprising, for each own pixel, a respective third displacement component along the bisector of a further angle formed by the first line of sight and a third line of sight of the second passive radar device with respect to the domain, so that the step of combining provides three components of the vector field.

As described, this makes it possible to combine three different displacement maps, one comprising the displacement components along the line of sight of the main radar device, the other two comprising the components along respective bisectors of the angles between the line of sight of the main radar device and the further lines of sight of the first and the second passive radar device, respectively. Therefore, a three-dimensional displacement vector field can be calculated from this combination, provided that the above further lines of sight are not coplanar.

In one exemplary embodiment, the step of prearranging at least one passive radar device provides a plurality of passive radar devices, and the method comprises a step of computing the displacement components each as an average value of a plurality of values obtained from independent measurements, which allows the displacement vector field to be calculated more precisely.

Advantageously, the step of synchronizing is carried out in the steps of firstly and secondly scanning, in particular, the step of synchronizing is carried out every predetermined number of consecutive steps of the scanning, more in particular, at each step of scanning.

The above-mentioned objects are also attained by an apparatus for determining a displacement vector field of a deformable scenario, comprising:
  a main radar device having a transmission unit comprising
    a transmission element; and a reception unit for receiving from a first field of sight;
  at least one passive radar device having a reception unit
    for receiving from a second field of sight, said reception unit arranged at a predetermined distance from the main radar device,
    the main radar device and the at least one passive radar device having respective oscillators associated to the reception unit and to the transmission unit;
    the main radar device and the at least one passive radar device arranged in such a way that the scenario is included in a region common to the first field of sight and to the second field of sight;
    the main radar device and the at least one passive radar device having respective positions and respective orientations in a global reference system,
  a synchronization device for aligning a time reference of the main radar device with a time reference of the at least one passive radar device, and for aligning a frequency reference of the oscillators of the main radar device and of the at least one passive radar device;
  a scanner for scanning the scenario by interferometrically determining at least one first displacement map and one second displacement map of the scenario between a previous time and a subsequent time in the main radar device and in the at least one passive radar device, respectively, the at least one first and one second maps expressed in the global reference system, the at least one first and one second maps having each a plurality of pixels each associated to a respective domain of the scenario, the first displacement map comprising, for each own pixel, a respective first displacement component along a first line of sight of the main radar device with respect to the domain, the second displacement map comprising, for each own pixel, a respective second displacement component along the bisector of an angle formed by the first line of sight and by a second line of sight of the at least one passive radar device with respect to the domain;
  a computer for combining the first displacement map with the second displacement map, the computer configured for combining the respective first component and the respective second component at each pixel to obtain a displacement vector of the respective domain between the previous time and the subsequent time, in order to form the displacement vector field.

Preferably, the oscillators of the main radar device and of the at least one passive radar device are GPS-disciplined oscillators, and the synchronization device is resident in both the GPS-disciplined oscillator of the main radar device and the GPS-disciplined oscillator of the at least one passive radar device, and is configured to receive a reference signal from GPS and to provide oscillating electronic signals responsive to the reference signal.

In particular, the scanner is configured for causing the main radar device and the at least one passive radar device to firstly and secondly scanning the scenario starting from the previous time and from the subsequent time, respectively, said steps of firstly and secondly scanning comprising in turn a plurality of consecutive steps, wherein the scanner is configured, in each consecutive steps:

- to cause the main radar device to emit transmission signals, by means of the transmission element of the transmission unit, wherein a transmission position and/or orientation of the transmission element is different with respect to another of the consecutive steps;
- to set the main radar device in a reception mode, synchronously and coherently to the radar transmission signals, in order to detect first data in the form of a back-scattered radar signal from the scenario;
- to set the passive radar device in a reception mode, synchronously and coherently to the radar transmission signals, in order to detect second data in the form of a scattered radar signal from the scenario, and the computer is configured:

- to process the first data and the second data in the main radar device and in the at least one passive radar device, respectively, obtaining a first previous image and a second previous image of the scenario, pertaining to the previous time, and a first subsequent image and a second subsequent image of the scenario, pertaining to the subsequent time;
- to compare the first subsequent image with the first previous image, and the second subsequent image with the second previous image, so as to obtain a first displacement map of the scenario and a second displacement map of the scenario, respectively, the first and the second maps expressed in the global reference system, the first and the second maps having each a plurality of pixels each associated to a respective domain of the scenario.

The main radar device can be selected among a synthetic-aperture radar (SAR), a real-aperture radar (RAR), which may be configured for emitting signals as a pencil beam or as a fan beam, and a active-phased array radar.

In an advantageous exemplary embodiment, the apparatus comprises two passive radar devices having a different elevation with respect to each other, and the scanner is configured for calculating a third displacement map comprising, for each own pixel, a respective third displacement component along the bisector of an angle between the first line of sight and a third line of sight of the second passive radar device with respect to the domain.

In one embodiment, the transmission unit of the main radar device comprises a slide element, and the transmission element is slidingly arranged along the slide element, and the scanner comprises an actuator for actuating a translation movement of the transmission element along the slide element.

In another embodiment, the transmission unit of the main radar device comprises a rotating shaft, and the transmission element is rotatably arranged about the rotating shaft, and the scanner comprises an actuator for actuating a rotation movement of the transmission element about the shaft.

In a further embodiment, the transmission unit comprises a plurality of transmission elements arranged at different positions and/or orientations with respect to one another in the transmission unit, wherein the scanner is configured to cause the transmission elements to selectively and subsequently emit the transmission signal.

Advantageously, the scanner is configured for modifying the position and/or the orientation of an own transmission element according to the predetermined scanning.

BRIEF DESCRIPTION OF THE DRAWINGS

The invention will be now shown with the following description of exemplary embodiments thereof, exemplifying but not limitative, with reference to the attached drawings, in which the same reference characters designate the same or similar parts, throughout the figures, in which:

FIGS. 6-9 diagrammatically show transmission units and reception units of apparatuses according to respective embodiments of the invention;

FIG. 13 is a block diagram of the method according to the invention, similar to the diagram of FIG. 1, but in the case of an apparatus comprising two passive radar devices;

FIG. 14 shows an apparatus according to a further exemplary embodiment in which a main electronic scanner such as a GBInRad system is provided comprising N transmitters and M receivers.

DESCRIPTION OF AN EXEMPLARY EMBODIMENT OF THE INVENTION

With reference to FIGS. 1 to 4, a method is described for measuring a displacement vector field of a scenario 9, in order to detect small orographic deformations or deformations of structures that that are present in the scenario.

Figure 2:
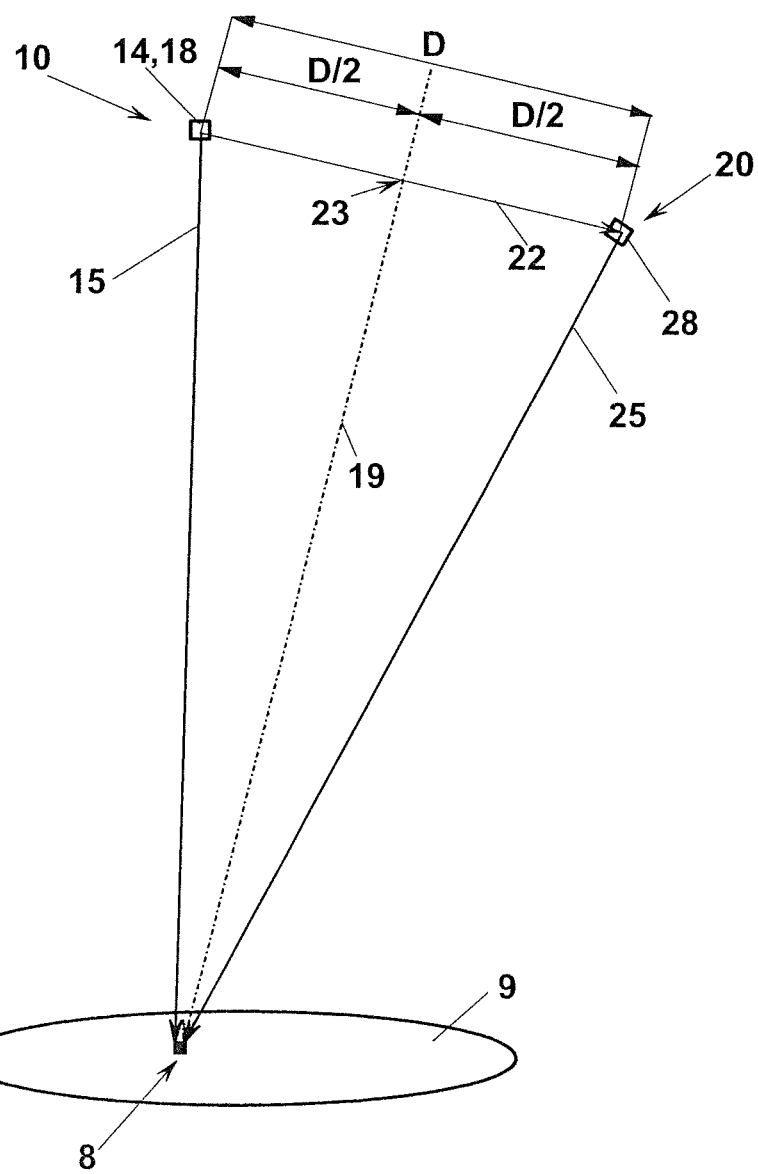
FIG. 2 diagrammatically shows a scenario and a radar apparatus operating according to the method according to the invention.
Figure 4:
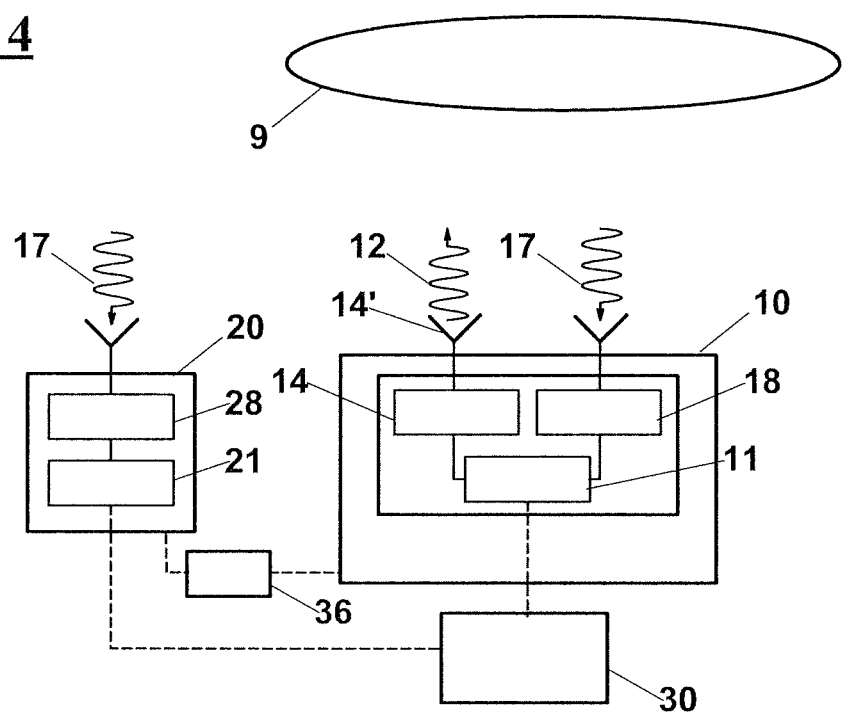
FIG. 4 diagrammatically shows an apparatus according to an exemplary embodiment of the invention comprising a single passive radar device.

The method comprises initial steps 51 and 52 of prearranging respectively a main radar device 10 and at least one passive radar device 20, in this case one passive radar device 20 (FIGS. 2 and 4).

Main radar device 10 is configured to transmit and receive radar signals in an own field of sight, not shown, and to carry out a radar scanning, i.e. to subsequently change the position and/or the orientation of an own transmission element 14' of transmission unit 14, preferably according to a prefixed number N of different positions and/or orientations, in order to have an at least two-dimensional resolution power of scenario 9.

Passive radar device 20 is so called because it is configured or used for only receiving radar signals from an own field of sight, not shown. Preferably, passive radar device 20 is built as a passive device, i.e. it doesn't comprise any signal transmission unit.

Main radar device 10 and passive radar device 20 have respective oscillators 11, 21 associated to transmission unit 14 and to a reception unit 18 of main radar device 10, as well as to a reception unit 28 of passive radar device 20. In the present invention, therefore, passive radar device 20, even if it is a constructionally passive device, is provided with an own oscillator 21.

As diagrammatically shown in FIG. 2, radar devices 10 and 20 are oriented towards scenario 9 and in such a way that scenario 9 is included in a region common to the fields of sight of main radar device 10 and of passive radar device 20.

Steps 51, 52 of prearranging radar devices 10, 20 comprise steps of measuring the respective positions and the respective orientations in a global reference system, such as, for example, the Universal Transverse Mercator (UTM) coordinate system.

Figure 1:
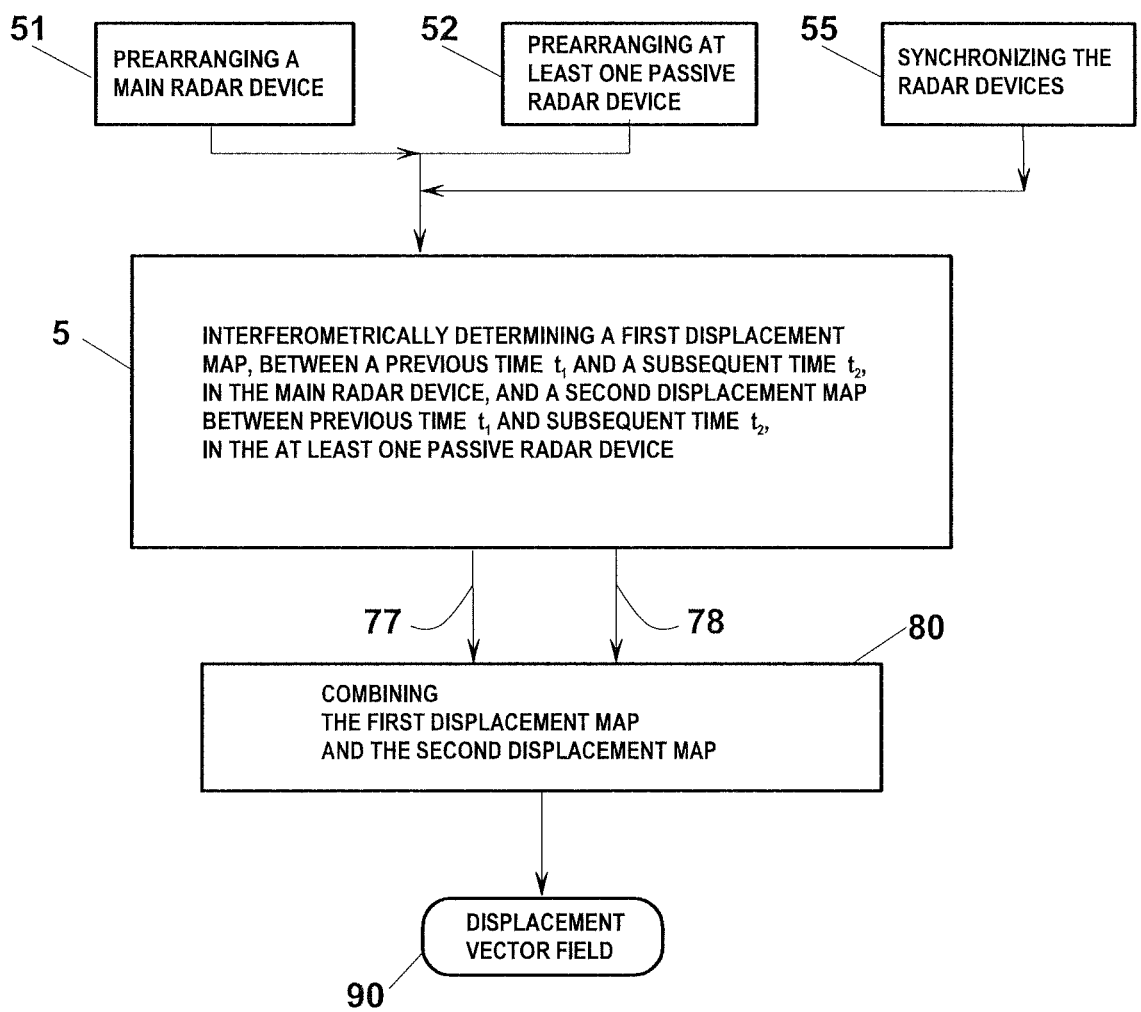
FIG. 1 is a block diagram of the method according to the invention.
Figure 5:
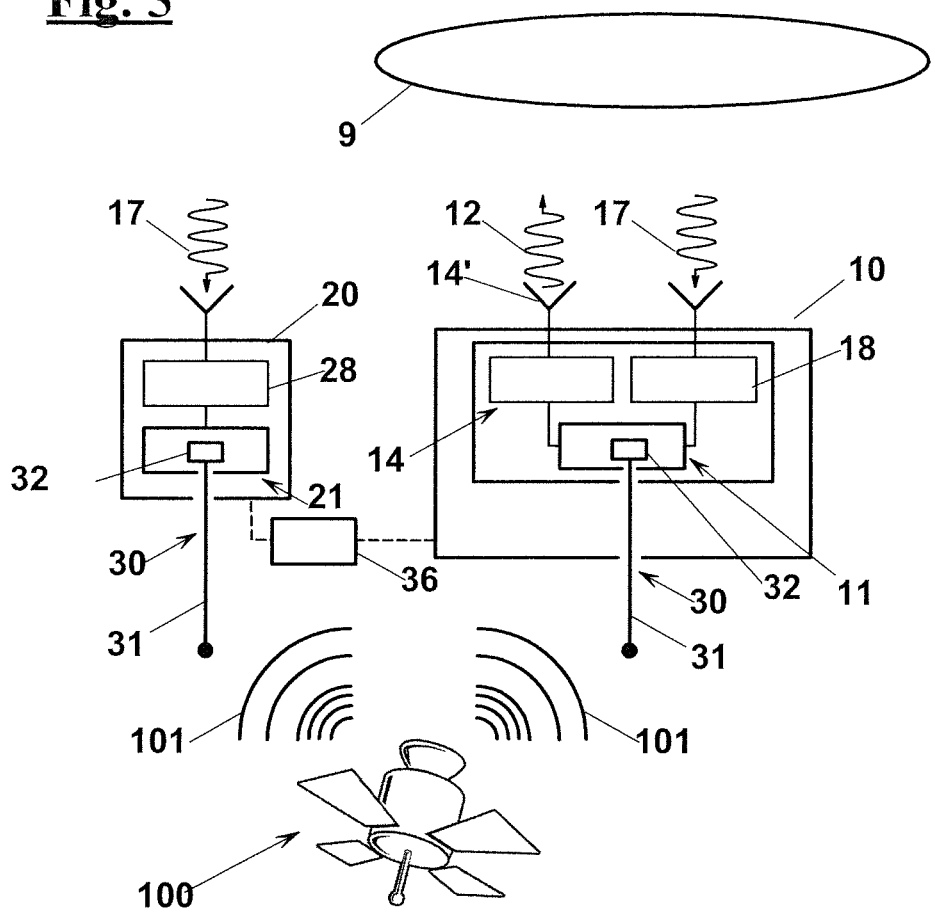
FIG. 5 diagrammatically shows an apparatus according to an exemplary embodiment of the invention similar to the apparatus of FIG. 4, in which a synchronization device is provided that uses a reference signal coming from a global positioning system, in particular it comprises GPS-disciplined oscillators.

Moreover, with reference to FIG. 1, a step 55 is provided of synchronizing passive radar device 20 with main radar device 10, in which the time and frequency reference of oscillator 21 of passive radar device 20 are aligned with the respective time reference of oscillator 11 of main radar device 10. The synchronizing of time and frequency references is performed with predetermined tolerances, in particular lower than $10^{-8}$ seconds and $10^{-1}$ Hertz, respectively. Such a precision can be advantageously obtained if the references of oscillators 11 and 21 are aligned with a reference signal 101 coming from a global positioning system 100, for example GPS. As shown in FIG. 5, this can be done if GPS-disciplined oscillators 11,21 are used, which include a synchronization device 30 comprising an antenna 31 configured to receive reference signal 101 from the antenna 31 and a processing unit 32 configured to receive reference signal 101 and to provide an oscillating electronic signal responsive to reference signal 101.

Figure 3:
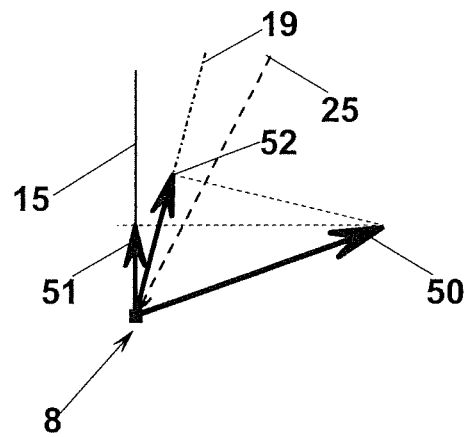
FIG. 3 shows a detail of a point of the scenario of FIG. 2, with the respective displacement components.

The method comprises a subsequent step of interferometrically determining 5 a first displacement map 77 and a second displacement map 78 of scenario 9, said displacement occurring between a previous time t' and a subsequent time t", in main radar device 10 and in passive radar device 20, respectively. First and second maps 77, 78 are expressed in the global reference system, such that they can be combined with each other, and comprise a plurality of pixels each corresponding to a respective domain 8 of scenario 9 (FIG. 2). As shown in FIG. 3, for each pixel, displacement maps 77, 78 are two scalar fields i.e. one-dimension fields that comprise respective displacement components 41 and 42 of domain 8, as observed along first line of sight 15 of main radar device 10, and along a line 19, respectively. Line 19 is the bisector of an angle θ set between first line of sight 15 and second line of sight 25 of passive radar device 20 with respect to domain 8. In other words, passive radar device 20 provides displacement map 78 of scenario 9 as if the apparatus comprised a second radar device including also a transmission unit, instead of passive radar device 20, said second radar device arranged at middle point 23 of segment 22 joining the position of main radar device 10 with the true position of passive radar device 20, as shown in FIG. 2.

Then, two displacement maps 77 and 78 are used to generate a searched displacement vector field 90, in this case a two-dimension vector field, representing the displacements that have occurred in scenario 9 between time t' and time t". To this purpose, a step 80 of combining first displacement map 77 and second displacement map 78 is provided, which can use conventional analytical techniques.

Figure 10:
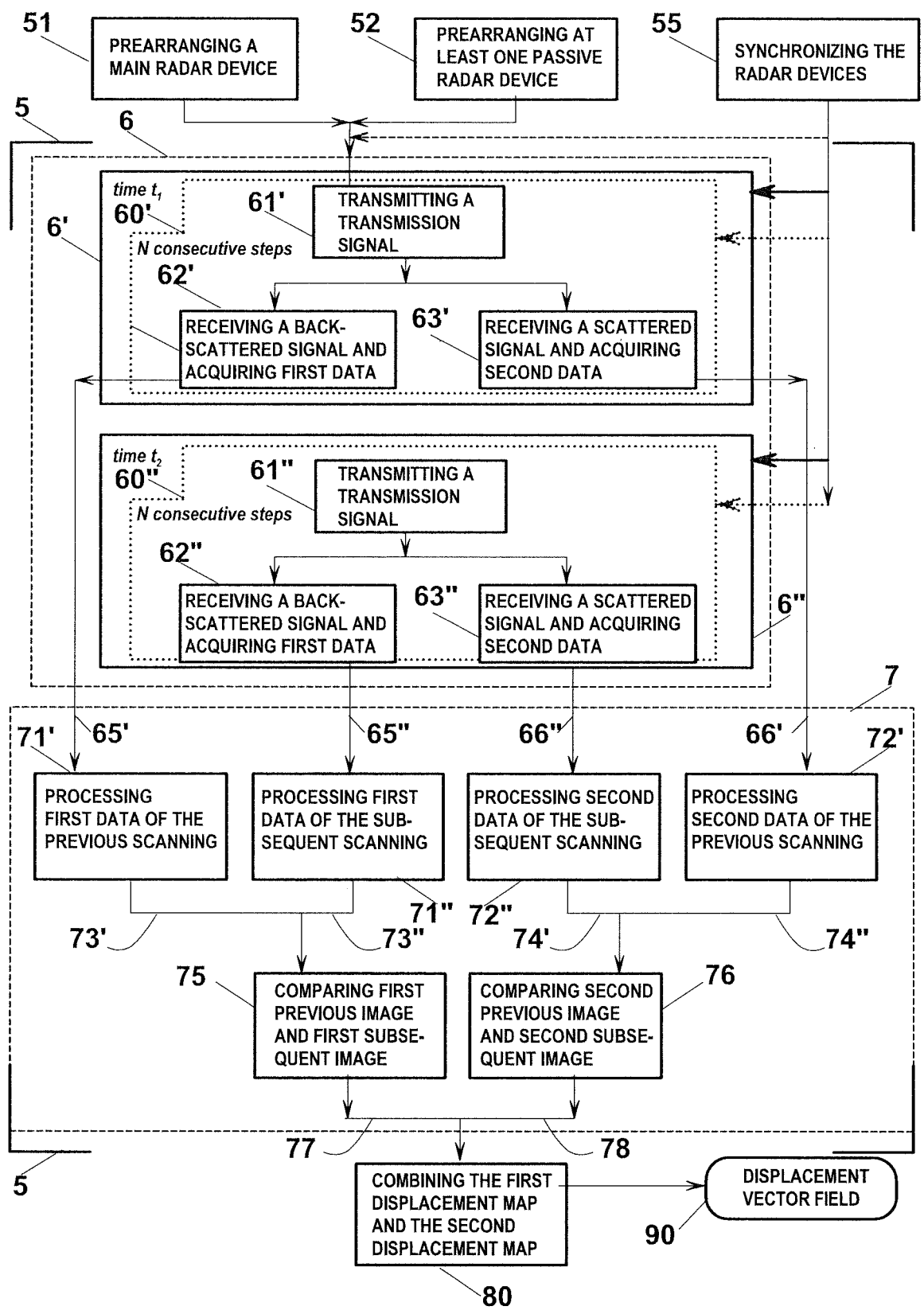
FIG. 10 is a block diagram of the method according to an exemplary embodiment of the invention, describing the interferometric technique for obtaining the displacement maps, in an apparatus comprising a single passive radar device.

As shown in FIG. 10, step 5 of interferometrically determining first and second displacement maps 77, 78 comprises a step 6 of scanning scenario 9 consisting of a first step 6' and a second step 6" of scanning. First and second steps 6',6" of scanning are started at previous time t' and at subsequent time t", respectively. Each step 6',6" of scanning comprises a plurality of N consecutive steps 60',60".

As well known in the interferometric radar technique, each step 60',60" comprises steps of transmitting 61',61" radar transmission signals 12 by main radar device 10. In each consecutive step 60',60", radar transmission signal 12 is emitted by a transmission element 14' of the transmission unit 14 that has a different transmission and/or orientation position in each consecutive step 60',60".

The different position and/or orientation of transmission element 14' can be obtained by displacing transmission element 14' or transmission unit 14 of main radar device 10 by a mechanical actuator 16' (FIGS. 6-8), or by orienting transmission signal 12 in main radar device 10, or by selecting a transmission element 14' among a plurality of differently located transmission elements 14' (FIG. 9).

In the first case, as shown in FIG. 6, main radar device 10 can be a synthetic aperture radar (SAR), wherein a same directional transmission element 14' of main radar device 10 has a different position in each step of scanning 6',6". In particular, a step is provided of shifting transmitting element 14' or transmission unit 14 along a preferably linear guide 29, such as a slide element 29, as well known in the interferometric radar technique.

In the second case, as shown in FIGS. 7 and 8, main radar device 10 can be a real aperture radar (RAR), in which transmission element is a directional transmission element 14' rotatably arranged about one rotation axis 24 (FIG. 7) or two rotation axes 24, 26 (FIG. 8). For instance, transmission signal 12 emitted by such a main radar device 10 can be a pencil beam, or a fan beam.

As an alternative, in the third case, main radar device 10 can be an electronic scan radar device, comprising a plurality of directional transmission elements 14' having different positions and/or orientations with respect to one another. As shown in FIG. 9, scanner 16 is configured to cause transmission elements 14' to selectively and subsequently emit transmission signal 12 through a selector 16", in other words, in each step of N consecutive steps 60',60" of scanning 6',6", different transmission elements 14' are subsequently activated for emitting transmission signal 12.

Each step 60',60" comprises a subsequent step 62',62" of receiving by main radar device 10, synchronously and coherently to step of transmitting 61',61", and a step 65',65" of acquiring first data in the form of a backscattered radar signal 17 backscattered by scenario 9, as FIGS. 3 and 4 show, according to a procedure well known in in the interferometric radar technique.

According to the invention, in each step 60',60" a step 63',63" is also provided of receiving by passive radar device 20 and a step 66',66" of acquiring second data in the form of a scattered radar signal 27 scattered by scenario 9 (FIGS. 4 and 5). In passive radar device 20, receiving step 63',63" is also carried out synchronously and coherently to step of transmitting 61',61" of main radar device 10, thanks to the narrow tolerance of the step of synchronizing passive radar devices 20 and main radar device 10, according to the invention.

The method, as shown in FIG. 10, can also comprise a step 7 of treating data or signals provided by scenario 9. Step 7 of treating data or signals comprises a step 71',71" of processing first data 65',65" in main radar device 10, and a step 71',71" of processing second data 66',66" in passive radar device 20. This way, a first previous image 73' and a second previous image 74' are obtained, i.e. images of scenario 9 pertaining to previous time t', and a first subsequent image 73" and a second subsequent image 74" are obtained, i.e. images of scenario 9 pertaining to subsequent time t", from main radar device 10 and from passive radar device 20, respectively, in the two cases.

First previous image 73' and first subsequent image 73" can be generated, in steps 71',71", 72',72" of processing data, in a local reference system of main radar device 10. Similarly, second previous image 74' and second subsequent image 74" can be generated in a local reference system of at least one passive radar device 20, which simplifies the calculations. Otherwise, all first and second, previous and subsequent images can be generated in the above-mentioned global reference system.

Steps 71',71", 72',72" of processing data can advantageously comprise steps of correcting errors possibly made when synchronizing oscillators 11,21.

Step 7 of treating data also comprises a step 75 of comparing first subsequent image 73" and first previous image 73', and a step 76 of comparing second subsequent image 74" and second previous image 74', obtaining first and second displacement maps 77, 78, respectively, of scenario 9.

The method can also comprise a step, not shown, of acquiring an digital elevation model of scenario 9, carried out before scanning 6. In this model, one of the three coordinates, typically the elevation, of a generic domain 8 of scenario 9 is expressed in the same global reference system used for measuring the position and the orientation of radar devices 10 and 20 in respective steps 51 and 52 of prearranging. Digital elevation model of scenario 9 can be obtained from a database, otherwise it can be obtained by measurements, for instance, by laser scanner measurements, GPS measurements, radar measurements and other measurements of known type.

Steps can be also provided of referring first 2D displacement map 77 to the digital elevation model, using the position and the orientation of main radar device 10, and steps of referring of second 2D displacement map 78 to the digital elevation model, using the position and the orientation of main radar device 10 and the position of passive radar device 20.

In other words, a displacement along line of sight 15 of main radar device 10 and a displacement along bisector 19 of the angle between lines of sight 15, 25 are associated to each pixel of the digital elevation model.

Figure 11:
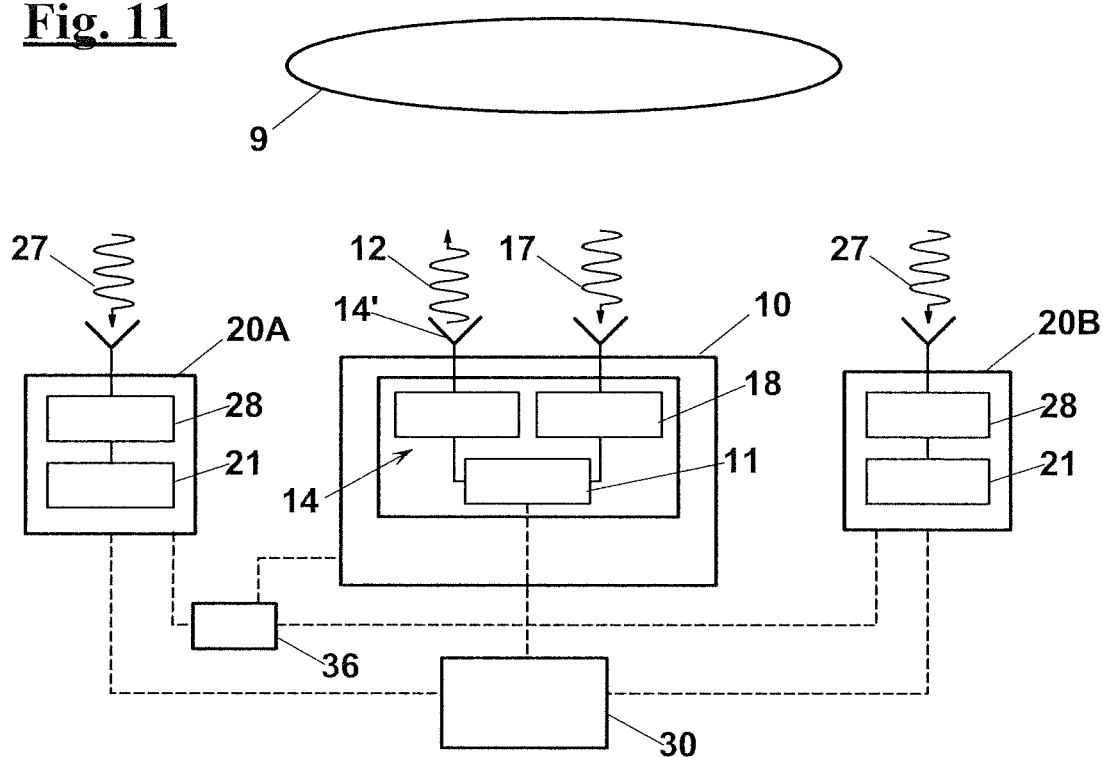
FIG. 11 diagrammatically shows an apparatus according to an exemplary embodiment of the invention comprising two passive radar devices.
Figure 12:
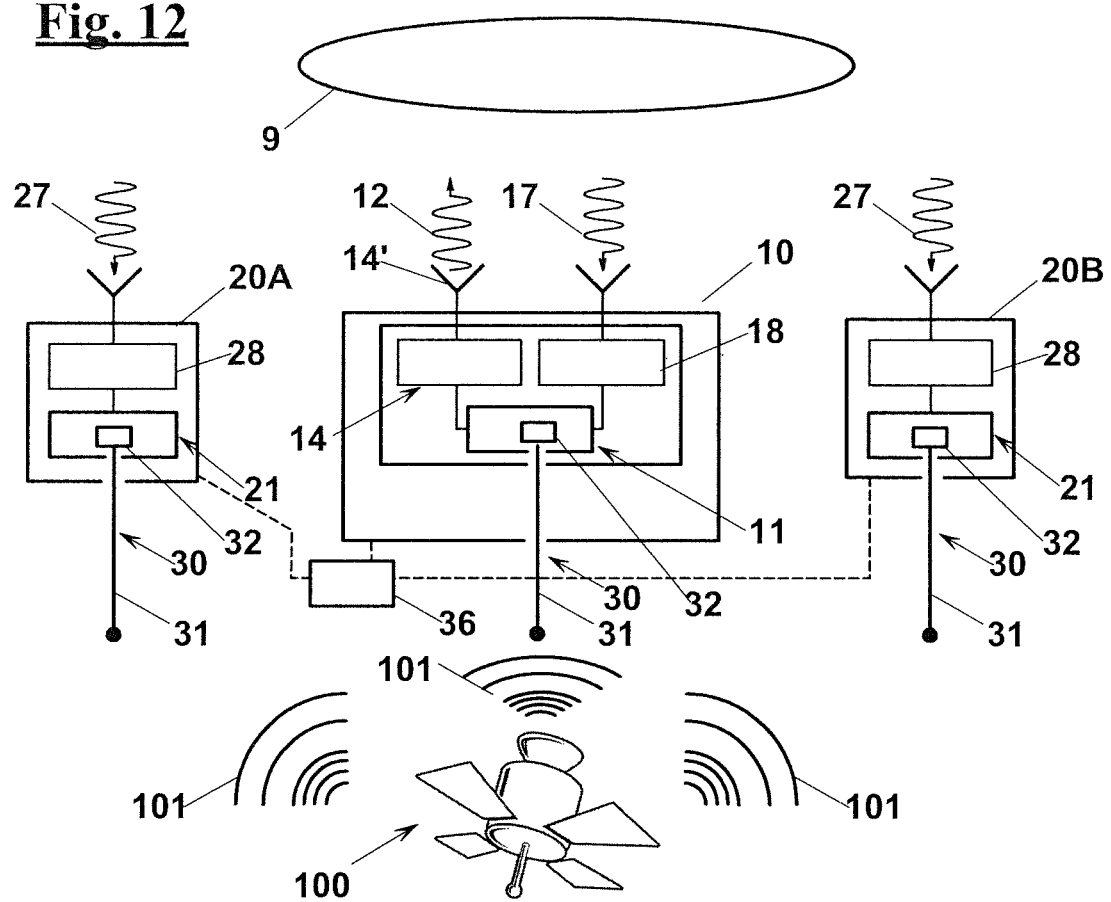
FIG. 12 diagrammatically shows an apparatus according to an exemplary embodiment of the invention similar to the apparatus of FIG. 11, wherein a synchronization device is provided that uses a reference signal coming from a global positioning system, in particular it comprises GPS-disciplined oscillators.

As shown in FIGS. 11 and 12, in step 52 of prearranging at least one passive radar device, several passive radar devices can be provided, for example two passive radar devices 20A, 20B. In this case, as shown in FIG. 9, step 5 of interferometrically determining displacement maps comprises steps of computing three displacement maps 77, 78, 79 that have occurred between previous time t' and subsequent time t", said steps of computing carried out in main radar device 10, in first passive radar device 20A and in second passive radar device 20B, respectively, where displacement maps 77, 78, 79 expressed in the global reference system. Displacement maps 77, 78 and 79 are scalar fields comprising, at each pixel, displacement components of a corresponding domain 8 of scenario 9, as observed along the lines of sight of this domain 8 with respect to main radar device 10, to first passive radar device 20A and to second passive radar device 20B, respectively. Step 80 of combining displacement maps generates a displacement vector field 90.

Step 5 of interferometrically determining displacement maps can have the structure described in FIG. 10, concerning the case of a single passive radar device, which can be easily modified to take into account a second passive radar device.

The apparatuses diagrammatically shown in FIGS. 11 and 12 differs from each other in that the apparatus of FIG. 12 comprises a synchronization device 30 using a reference signal 101 from antenna 31 coming from a global positioning system 100. To this purpose, synchronization device 30 comprises an antenna 31 configured to receive reference signal 101 and a processing unit 32 configured to receive reference signal 101 and to provide an oscillating electronic signal responsive to reference signal 101. In particular the apparatus of FIG. 12 comprises GPS-disciplined oscillators 11, 21, which include such synchronization device 30.

In particular, two passive radar devices 20A and 20B are arranged at elevations different from each other, so that the respective lines of sight, and therefore the three displacement components of each domain 8, are not coplanar. Accordingly, step 80 of combining displacement maps generates a three-dimensional displacement vector field 90.

With reference to FIG. 14, in a further exemplary embodiment, the apparatus comprises a main GBInRad system 10 having N transmitters and M reception units connected to a same oscillator 11, and also comprises an electronic scanner 16 which makes it possible to obtain an imaging of monitored domains 8. According to the invention, at least one passive radar device 20 is provided along with main radar system 10, said or each passive radar device including a receiver 28 connected to an oscillator 21. A synchronization device of the type specified above is also provided, in particular oscillators 11, 21 can be GPS-disciplined oscillators, so as to synchronize scattered signal 27 from scenario 9 with main radar device 10.

The foregoing description exemplary embodiments of the invention will so fully reveal the invention according to the conceptual field of sight, so that others, by applying current knowledge, will be able to modify and/or adapt for various applications such embodiment without further research and without parting from the invention and, accordingly, it is therefore to be understood that such adaptations and modifications will have to be considered as equivalent to the specific embodiments. The means and the materials to realise the different functions described herein could have a different nature without, for this reason, departing from the field of the invention. It is to be understood that the phraseology or terminology that is employed herein is for the purpose of description and not of limitation.

The invention claimed is:

1. A method for determining a displacement vector field of a deformable scenario, comprising the steps of:
    prearranging a main radar device having a transmission unit and a main radar device reception unit for receiving from a first field of sight;
    prearranging at least one passive radar device having a passive radar device reception unit for receiving from a second field of sight, at a predetermined distance from said main radar device, said main radar device and said or each passive radar device having respective oscillators associated to said main radar device reception unit and to said transmission unit, or to said passive radar device reception unit, respectively;

said main radar device and said or each passive radar device arranged in such a way that said scenario is included in a region common to said first field of sight and to said second field of sight;

wherein the steps of prearranging said main radar device and said or each passive radar device comprise steps of measuring respective positions and respective orientations in a global reference system, synchronizing said or each passive radar device with said main radar device, comprising:

a step of aligning a time reference of said main radar device with a time reference of said or each passive radar device;

a step of aligning an oscillation frequency reference of said oscillators of said main radar device and of said or each passive radar device;

interferometrically determining at least one first displacement map and a second displacement map of said scenario between a previous time and a subsequent time in said main radar device and in said or each passive radar device, respectively, said at least one first and one second displacement maps expressed in said global reference system, said at least one first and one second displacement maps having each a plurality of pixels each associated to a respective domain of said scenario, said first displacement map comprising, for each own pixel, a respective first displacement component along a first line of sight of said main radar device with respect to said domain, said second displacement map comprising, for each own pixel, a respective second displacement component along the bisector of an angle formed by said first line of sight and by a second line of sight of said or each passive radar device with respect to said domain;

combining said first displacement map and said second displacement map, wherein at each pixel said respective first displacement component and said respective second displacement component are combined to obtain a displacement vector of said respective domain between said previous time and said subsequent time, in order to form said displacement vector field, wherein said step of interferometrically determining said first and said second displacement map comprises steps of:

firstly and secondly scanning said scenario, said firstly and said secondly scanning performed starting from said previous time and from said subsequent time, respectively, each of said firstly and secondly scanning comprising a plurality of consecutive steps, each step comprising the steps of:

transmitting radar transmission signals by said main radar device, wherein, in each of said consecutive steps, said radar transmission signal is emitted by a transmission element of said transmission unit of said main radar device having a different transmission and/or orientation position with respect to another of said consecutive steps;

receiving, by said main radar device, synchronously and coherently to said step of transmitting, and acquiring first data in the form of a backscattered radar signal from said scenario;

receiving, by said or each passive radar device, synchronously and coherently to said step of transmitting, and acquiring second data in the form of a scattered radar signal coming from said scenario;

processing said first data and said second data in said main radar device and in said or each passive radar device, respectively, obtaining a first and a second previous image of said scenario, pertaining to said previous time, and a first and a second subsequent image of said scenario, pertaining to said subsequent time;

comparing said first subsequent image with said first previous image, and said second subsequent image with said second previous image, obtaining a first displacement map and a second displacement map, respectively, of said scenario, said first and second displacement maps expressed in said global reference system, said first and second displacement maps having each a plurality of pixels each associated to a respective domain of said scenario.

2. The method according to claim 1, wherein said steps of aligning said step of synchronizing are carried out through a reference signal coming from a global positioning system, such that said step of aligning a time reference is carried out within a predetermined time tolerance range narrower than $10^{-8}$ seconds and said step of aligning a frequency reference is carried out within a frequency tolerance range narrower than 10-1 Hertz.

3. The method according to claim 1, wherein said step of processing comprises a step of correcting synchronization errors between said oscillators.

4. The method according to claim 1, wherein said first previous image and said first subsequent image are formed in a local reference system of said main radar device and said second previous image and said second subsequent image are formed in a local reference system of said at least one passive radar device.

5. The method according to claim 1, wherein said main radar device is a radar selected from the group consisting of:
a synthetic aperture radar (SAR), wherein a same transmission element of said transmission unit of said main radar device has a different position in each of said consecutive steps;
a real aperture radar (RAR), wherein said transmission element is a directional transmission element rotatably arranged about an axis and that has a different orientation in each of said consecutive steps;
an active-phased array radar, comprising a plurality of transmission elements having different positions, wherein a respective transmission element is operated at each of said consecutive steps of said step of firstly and secondly scanning for performing said step of transmitting.

6. The method according to claim 1, wherein said first and second previous images and said first and second subsequent images are two-dimensional images, and wherein a step is provided of acquiring a digital three-dimensional model of said scenario, said digital three-dimensional model associating three coordinates, expressed in said global reference system, to each domain of said scenario, in order to associate said displacement vector field to said digital three-dimensional model.

7. The method according to claim 1, wherein said step of prearranging at least one passive radar device provides prearranging a first and a second passive radar devices having a different elevation with respect to each other, and said step of interferometrically determining generates a third displacement map comprising, for each own pixel, a respective third displacement component along the bisector of a further angle formed by said first line of sight and a third line of sight of said second passive radar device with respect to said domain, so that said step of combining provides a 3D vector field.

8. The method according to claim 1, wherein said step of synchronizing is carried out in said steps of firstly and secondly scanning.

9. The method according to claim 8, wherein said step of synchronizing is carried out every predetermined number of consecutive steps of said scanning.

10. The method according to claim 8, wherein said step of synchronizing is carried out at each step of said scanning.

11. An apparatus for determining a displacement vector field of a deformable scenario, comprising:
a main radar device having a transmission unit comprising a transmission element; and
a main radar device reception unit for receiving from a first field of sight;
at least one passive radar device having a passive radar device reception unit for receiving from a second field of sight, said passive radar device reception unit arranged at a predetermined distance from said main radar device, said main radar device and said or each passive radar device having respective oscillators associated to said main radar device reception unit and to said transmission unit, or to said passive radar device reception unit, respectively;
said main radar device and said or each passive radar device arranged in such a way that said scenario is included in a region common to said first field of sight and to said second field of sight;
said main radar device and said or each passive radar device having respective positions and respective orientations in a global reference system, a synchronization device for aligning a time reference of said main radar device with a time reference of said or each passive radar device, and for aligning a frequency reference of said oscillators of said main radar device and of said or each passive radar device;
a scanner for scanning said scenario by interferometrically determining at least one first displacement map and one second displacement map of said scenario between a previous time and a subsequent time in said main radar device and in said or each passive radar device, respectively, said at least one first and one second displacement maps expressed in said global reference system, said at least one first and one second displacement maps having each a plurality of pixels each associated to a respective domain of said scenario, said first displacement map comprising, for each own pixel, a respective first displacement component along a first line of sight of said main radar device with respect to said domain, said second displacement map comprising, for each own pixel, a respective second displacement component along the bisector of an angle formed by said first line of sight and by a second line of sight of said or each passive radar device with respect to said domain;
a computer for combining said first displacement map with said second displacement map, wherein said computer is configured for combining said respective first component and said respective second component at each pixel to obtain a displacement vector of said respective domain between said previous time and said subsequent time, in order to form said displacement vector field,
wherein said scanner is configured for causing said main radar device and said at least one passive radar device to firstly and secondly scanning said scenario starting from said previous time and from said subsequent time, respectively, said steps of firstly and secondly scanning comprising in turn a plurality of consecutive steps, wherein said scanner is configured, in each consecutive steps:
to cause said main radar device radar to emit transmission signals, by means of said transmission element whose transmission position and/or orientation is different with respect to another of said consecutive steps;
to set said main radar device in a reception mode, synchronously and coherently to said radar transmission signals, in order to detect first data in the form of a back-scattered radar signal from said scenario;
to set said passive radar device in a reception mode, synchronously and coherently to said radar transmission signals, in order to detect second data in the form of a scattered radar signal from said scenario, and said computer is configured:
to process said first data and said second data in said main radar device and in said at least one passive radar device, respectively, obtaininq a first previous image and a second previous image of said scenario, pertaining to said previous time, and a first subsequent image and a second subsequent image of said scenario, pertaining to said subsequent time;
to compare said first subsequent image with said first previous image, and said second subsequent image with said second previous image, so as to obtain a first displacement map of said scenario and a second displacement map of said scenario, respectively, said first and said second maps expressed in said global reference system, said first and said second maps having each a plurality of pixels each associated to a respective domain of said scenario.

12. The apparatus according to claim 11, wherein said oscillators of said main radar device and of the at least one passive radar device are GPS-disciplined oscillators, and said synchronization device is resident in both said GPS: disciplined oscillator of said main radar device and said GPS-disciplined oscillator of said at least one passive radar device, and is configured to receive a reference signal from GPS and to provide oscillating electronic signals responsive to said reference signal.

13. The apparatus according to claim 11, wherein said transmission unit comprises a slide element along which said transmission element is slidingly arranged, wherein said scanner comprises an actuator for actuating a translation movement of said transmission element along said slide element.

14. The apparatus according to claim 11, wherein said transmission unit comprises a rotating shaft, about which said transmission element is rotatably arranged, wherein said scanner comprises an actuator for actuating a rotation movement of said transmission element about said shaft.

15. The apparatus according to claim 11, wherein said transmission unit comprises a plurality of transmission elements arranged at different positions and/or orientations with respect to one another in said transmission unit, wherein said scanner is configured to cause said transmission elements to selectively and subsequently emit said transmission signal.

* * * * *